US012712759B2

(12) United States Patent
Mutter et al.

(10) Patent No.: US 12,712,759 B2
(45) **Date of Patent: *Aug. 18, 2026**

(54) SUBSCRIBER STATION AND METHOD FOR DETERMINISTIC COMMUNICATION IN A SERIAL BUS SYSTEM

(71) Applicant: Robert Bosch GmbH, Stuttgart (DE)

(72) Inventors: Arthur Mutter, Neuhausen (DE); Florian Hartwich, Reutlingen (DE)

(73) Assignee: ROBERT BOSCH GMBH, Stuttgart (DE)

( * ) Notice: Subject to any disclaimer, the term of this patent is extended or adjusted under 35 U.S.C. 154(b) by 8 days.

This patent is subject to a terminal disclaimer.

(21) Appl. No.: 18/947,845

(22) Filed: Nov. 14, 2024

(65) Prior Publication Data

US 2025/0175364 A1 May 29, 2025

(30) Foreign Application Priority Data

Nov. 28, 2023 (DE) .................... 10 2023 211 866.1

(51) Int. Cl.
*H04L 12/40* (2006.01)

(52) U.S. Cl.
CPC .... *H04L 12/40013* (2013.01); *H04L 12/4015* (2013.01)

(58) Field of Classification Search
None
See application file for complete search history.

(56) References Cited

U.S. PATENT DOCUMENTS 7,688,845 B2 * 3/2010 Salo ........................ H04L 12/43 370/282
9,425,992 B2 * 8/2016 Brochi ................ H04L 12/6418
10,797,854 B1 * 10/2020 Heurtefeux ............. H04L 7/027
12,432,087 B2 * 9/2025 Elend .................. G06F 11/0745
2005/0094642 A1 * 5/2005 Rogers .................... H04L 47/50 370/498
2024/0243945 A1 * 7/2024 Goyal .................. H04L 69/321

OTHER PUBLICATIONS

ISO 11898-1:2015 Standard, "Road Vehicles—Controller Area Network (CAN)—Part 1: Data Link Layer and Physical Signalling," 2015, pp. 1-74.

* cited by examiner

*Primary Examiner* — Elias Mamo
(74) *Attorney, Agent, or Firm* — NORTON ROSE FULBRIGHT US LLP

(57) ABSTRACT

A subscriber station and method for deterministic communication in a serial bus system. The subscriber station has a communication control device for controlling a communication of the subscriber station by generating messages based on a frame and by transmitting the messages to a bus of the bus system and by evaluating at least one signal received from a bus of the bus system based on the frame, with which frame the bit time in a first communication phase can differ from a bit time in a second communication phase, and a pause module for evaluating at least one item of status information output by the communication control device, wherein the pause module is designed to generate and output a transmission delay signal based on a result of its evaluation, to delay or not to delay the provision of a transmission message to the communication control device.

17 Claims, 4 Drawing Sheets

40
41
42
system ASIC
transmitting/
receiving
device
16
12
121
122
power
supply
device
17
161
application
transmitting
module
TXD
RXD
receiving
module
microcontroller
communication
control device
11
13
ST_A
pause
module
1523
152
1522A
1522
1521B
1521
1521A
transmission
waiting device
15
10
153
&
TX_S
TX_E
TX_D
1512
1512A
TX_R
1511
transmission
message buffer
1511A
151
evaluation block
1513
1521A
message
handling
device
reception
message
buffer Z_40
i
i
A123, TX3
A12, TX2
A1, TX1
i
i
A1, TX1
A3, TX3
i
A1, TX1
E1
E1
E5
E2
E5
E2
E5
E2
E3
E1
E1
E5
E2
E3
E2
E1
E2
E3
T0
T1
T2
T3
t TX_E
1
0
T0
T1
T2
T3
t

SUBSCRIBER STATION AND METHOD FOR DETERMINISTIC COMMUNICATION IN A SERIAL BUS SYSTEM

CROSS REFERENCE

The present application claims the benefit under 35 U.S.C. § 119 of German Patent Application No. DE 10 2023 211 866.1 filed on Nov. 28, 2023, which is expressly incorporated herein by reference in its entirety.

FIELD

The present invention relates to a subscriber station and a method for deterministic communication in a serial bus system.

BACKGROUND INFORMATION

For cost reasons, bus systems are preferred by many vehicle manufacturers over point-to-point connections. Increasingly higher data transmission rates are required for communication between technical devices such as sensors and control devices.

In some bus systems, technical devices are to communicate with one another, where applicable being able to switch as required between different standards for communication and/or data transmission rates between the subscriber stations of the bus system.

Currently, Classical CAN and/or CAN FD, which are both standardized in the international standard ISO 11898-1: 2015, are used for communication between devices in vehicles and/or in other technical devices.

In a CAN-bus-based communication, a frame is used for generating a transmission signal, the frame being divided into an arbitration phase and a data phase. In the arbitration phase, negotiations are held between the subscriber stations of the bus system as to which of the subscriber stations of the bus system will be given exclusive access to the bus in the following data phase and then be allowed to send its data to the bus. In CAN FD and in CAN XL, the bits of the transmission signal are generated with a shorter bit time in the data phase than in the arbitration phase and transmitted to the bus. Thus, the bits are generated and transmitted at a higher bit rate in the data phase.

CAN FD is used by most users in the vehicle in the first step with a data bit rate of 2 Mbit/s and an arbitration bit rate of 500 kbit/s. So-called CAN SIC transmitting/receiving devices, which are also called transceivers, make possible the use of CAN FD with up to 8 Mbit/s.

CAN XL, which is compatible with CAN FD and is specified in ISO 11898-1, can also be used. With the aid of SIC and SIC XL transmitting/receiving devices, bit rates of up to 8 Mbit/s or 20 Mbit/s are possible in the data phase with CAN XL. On the other hand, with CAN XL, the bit rate remains at approximately 500 kbit/s in the arbitration phase in order to make arbitration possible. In addition, with CAN XL, payload data lengths of up to 2048 bytes can be used. The use of CAN XL in real-world products is currently starting. This means that high data transmission rates can already be realized in a bus system in vehicles today.

For the operation of autonomous or semi-autonomous vehicles, however, an important requirement is that predetermined maximum reception delays are observed for individual transmitted frames. Such delays are also called worst-case delays. This means that a frame must arrive at the receiving subscriber station (receiving node) after the worst-case delay at the latest. Delays are caused, for example, by other frames or signals that occupy the bus.

Within a bus system, the above requirement can be solved with the aid of deterministic bus access.

For such bus access, the Ethernet transceiver 10BASE-T1S, which has been standardized by the IEEE, uses a method called PLCA (Physical Layer Collision Avoidance). With PLCA, each node has a node number. All nodes transmit in sequence. In the literature, this is called round robin (RR) scheduling. In addition, the PLCA method requires a master node (subscriber station). At the start of a cycle, the master node transmits a so-called BEACON signal, which marks the start of the cycle. Each node may transmit 1 frame in each cycle. The PLCA method offers determinism and allows the fair distribution of communication bandwidth among all nodes. However, the disadvantage is that a master node is indispensable, even if this represents a risk for functional safety. Another disadvantage is that the configuration of the individual nodes with node numbers is highly complex.

Arbitration in CAN-based bus systems uses the CSMA/CR method (CR=collision resolution) at the start of the frame, which resolves transmission collisions on the bus. The resolution of the collision is effected based on the identifier (ID) of the frame. The frame with the highest-priority identifier (ID) prevails on the bus. This corresponds to strict priority scheduling. This is currently sufficient for many applications in autonomous vehicles. However, arbitration is not initially suitable for applications that require deterministic bus access.

In some cases, this problem can be solved by selecting a higher bit rate on the CAN bus than required, so that the CAN bus is only, for example, 50% utilized. As a result, however, the net data rate is severely limited. In any case, the possible net data rate cannot be achieved at maximum bus utilization.

SUMMARY

It is an object of the present invention to provide a subscriber station and a method for deterministic communication in a serial bus system, which solve the problems mentioned above. In particular, a subscriber station and a method for deterministic communication in a serial bus system are to be provided, with which, even when different communication standards and bit rates are used in the bus system, deterministic bus access can be realized and guaranteed for individual subscriber stations in a straightforward, cost-effective and secure manner, even at maximum bus utilization.

This object may be achieved by a subscriber station for deterministic communication in a serial bus system with certain features of the present invention. According to an example embodiment of the present invention, the subscriber station has a communication control device for controlling a communication of the subscriber station with at least one other subscriber station of the bus system by generating a message based on a frame and by transmitting the message onto a bus (40) of the bus system, and by evaluating at least one signal received from a bus of the bus system based on the frame, with which frame the bit time in a first communication phase can differ from a bit time in a second communication phase, and a pause module for evaluating at least one item of status information output by the communication control device, wherein the pause module is designed to generate and output a transmission delay signal on the basis of a result of its evaluation, in order to delay or not delay the provision of a transmission message to the communication control device, wherein the transmission message is to be transmitted by the communication control device as a message to the bus.

The embodiment of the subscriber station of the present invention described herein makes possible deterministic bus access, without a master subscriber station specifying when transmission is permitted. Due to this decentralized approach, the subscriber station guarantees a high level of communication security at a very low cost.

Advantageously, the subscriber station described allows CAN bus utilization of 100% and at the same time deterministic bus access. In particular, as a result, both a high data bit rate, as with CAN XL, can be realized and the requirements for applications with hard real-time requirements can be met.

In addition, a partially deterministic bus access of the described subscriber station is also possible in a bus system in which not all subscriber stations on the bus are designed for deterministic bus access.

In addition, the subscriber station described is 100% compatible with CAN subscriber stations that already exist. As a result, a migration of CAN bus systems that already exist to the technology described is highly cost-effective and straightforward. The subscriber station described also makes it possible for at least one subscriber station to be present in the bus system, which subscriber station can transmit messages to the bus according to different CAN standards. For example, in addition to two CAN XL subscriber stations, at least one other subscriber station which transmits messages to the bus according to another/a different CAN standard can thus also be present in the bus system.

The subscriber station described thus also offers the use of CAN for applications with hard real-time requirements. The technology of the subscriber station described is suitable for replacing FlexRay.

Another advantage is the highly straightforward and uncomplicated configuration of the subscriber station and thus the implementation of the method it carries out in the bus system. The reason for this is that with a CAN bus system, only one scalar parameter is used per CAN subscriber station. This means that the system designer can set the behavior on the CAN bus in relation to the desired level of determinism or transmission strictly according to priority with just one configuration parameter per CAN subscriber station.

Advantageous further example embodiments of the subscriber station of the present invention are disclosed herein.

According to an example embodiment of the present invention, the pause module can be designed to set the transmission delay signal to a predetermined value according to which transmission to the bus of a transmission message provided to the communication control device is to be delayed, only after the communication control device has transmitted N frames, where N is a natural number greater than or equal to 1.

According to an example embodiment of the present invention, the subscriber station can also comprise a transmission message waiting device, which comprises the pause module. Additionally or alternatively, the pause module can be configured for determining whether the transmission of the transmission message to the bus is to be delayed or not.

The subscriber station according to an example embodiment of the present invention can also have a message handling module for providing the transmission message to the communication control device, and a logic module for outputting the transmission message to the communication control device on the basis of the determination of the pause module.

In one embodiment of the present invention, the communication control device can be designed to, in the first communication phase, negotiate with the other subscriber stations as to which of the subscriber stations of the bus system will be given at least temporarily exclusive, collision-free access to the bus in the subsequent second communication phase.

It is possible that the pause module is designed for evaluating the at least one item of status information in relation to at least one event on the bus and one configuration parameter.

The pause module possibly has a configuration buffer for storing the configuration parameter, which is selectable for the subscriber station as required, and optionally a configuration parameter that specifies at least one type of the at least one event.

The at least one event on the bus can comprise or be that the communication control device sees the bus in the idle state for one bit.

The at least one event on the bus can comprise or be that the communication control device has started receiving a signal from the bus corresponding to the frame.

The at least one event on the bus can comprise or be that the communication control device has successfully transmitted a signal corresponding to the frame to the bus.

The at least one event on the bus can comprise or be that the communication control device has recognized an error when transmitting a signal corresponding to the frame.

The at least one event on the bus can comprise or be that the communication control device has started transmitting a signal corresponding to the frame.

In one example embodiment of the present invention, the subscriber station described above further has a counter for counting the at least one event, wherein the counter is design to count all events occurring in the at least one item of status information output by the communication control device, wherein the pause module changes the value of the transmission delay signal, in order to not delay the communication control device from providing a transmission message if the number of events counted by the counter is equal to the configuration parameter.

In one example embodiment of the present invention, the pause module is designed to increment a count value of the counter after detecting one of the events described above, wherein the pause module is designed to reset the count value of the counter after detecting one of the events described above and to change the value of the transmission delay signal, in order to delay the communication control device from providing a transmission message.

The subscriber station of the present invention described above possibly also has a transmitting/receiving device, which is connected to the bus and is designed for generating a digital reception signal from the at least one signal received from the bus, wherein the communication control device is designed to sample and evaluate the reception signal generated by the transmitting/receiving device in accordance with the predetermined frame.

According to an example embodiment of the present invention, at least two of the subscriber stations described above can be part of a bus system that also has a bus, wherein the at least two subscriber stations are connected to one another via the bus in such a way that the subscriber stations can communicate in series with one another.

The object mentioned above may also be achieved by a method for deterministic communication in a serial bus system according to certain features of the present invention. The method of the present invention is carried out with a subscriber station that comprises a communication control device and a pause module, wherein the communication control device is designed for controlling a communication of the subscriber station with at least one other subscriber station of the bus system by generating a message based on a frame and by transmitting the message to a bus of the bus system and by evaluating at least one signal received from a bus of the bus system based on the frame, with which frame the bit time in a first communication phase can differ from a bit time in a second communication phase, and wherein the method comprises the steps of evaluating, with the pause module, at least one item of status information output by the communication control device, and generating, with the pause module on the basis of a result of its evaluation, a transmission delay signal, in order to delay or not to delay the provision of a transmission message to the communication control device, wherein the transmission message is to be transmitted by the communication control device as a message to the bus.

The method of the present invention offers the same advantages as those mentioned above in relation to the subscriber station of the present invention.

Further possible implementations of the present invention also include combinations, even those not explicitly mentioned, of features or embodiments described above or below with respect to the exemplary embodiments. In this case, a person skilled in the art will also add individual aspects as improvements or additions to the relevant basic form of the present invention.

BRIEF DESCRIPTION OF THE DRAWINGS

The present invention is described in more detail below with reference to the figures and on the basis of exemplary embodiments of the present invention.

In the figures, identical or functionally identical elements are given the same reference signs unless otherwise indicated.

DETAILED DESCRIPTION OF EXAMPLE EMBODIMENTS

Figures 1, 2:
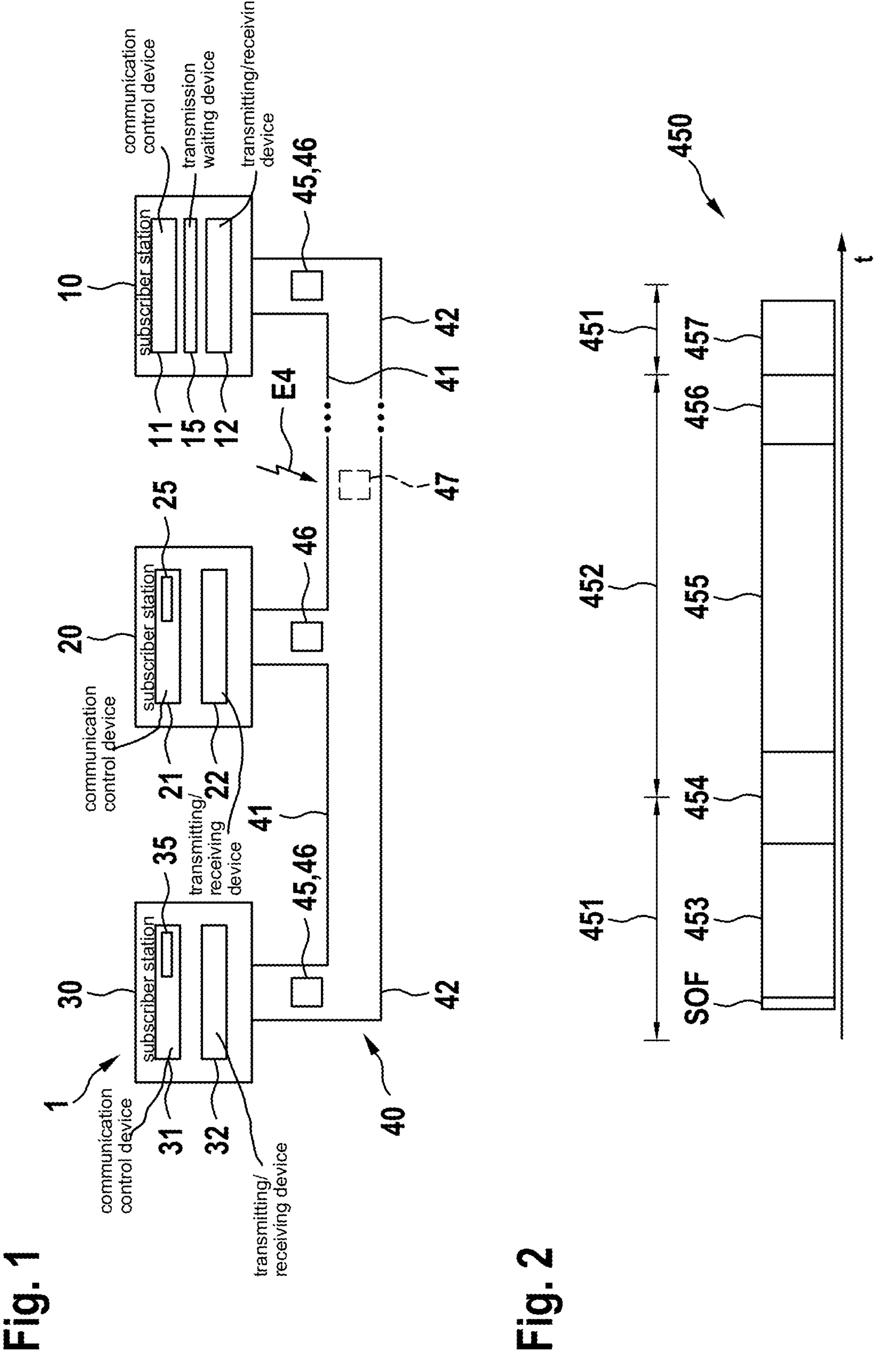
FIG. 1 shows a simplified block diagram of a bus system according to a first exemplary embodiment of the present invention.
FIG. 2 shows a diagram for illustrating the structure of a message which can be transmitted by a subscriber station of the bus system according to the first exemplary embodiment of the present invention.

FIG. 1 shows an example of a bus system 1, which is in particular fundamentally designed for a CAN bus system, a CAN FD bus system, a CAN XL bus system, and/or modifications thereof, as described below. The bus system 1 can be used in a vehicle, in particular a motor vehicle, an aircraft, etc., or in a hospital, etc.

In FIG. 1, the bus system 1 has a plurality of subscriber stations 10, 20, 30, which are each connected to a bus 40 with a first bus wire 41 and a second bus wire 42. The bus wires 41, 42 can also be referred to as CAN_H and CAN_L and are used for electrical signal transmission after the coupling-in of the dominant levels or generation of recessive levels or other levels for a signal in the transmission state. Messages 45, 46 in the form of signals can be transmitted between the individual subscriber stations 10, 20, 30 in series via the bus 40. If a fault occurs during communication to the bus 40, as shown by the jagged black block arrow in FIG. 1, one of the subscriber stations 10, 20, 30 can optionally transmit an error frame 47 with an error flag and an error delimiter. In particular, the fault may be an event E4, on the basis of which one of the subscriber stations 10, 20, 30 has recognized an error when transmitting or receiving a message 45, 46. The subscriber stations 10, 20, 30 of FIG. 1 are, for example, control devices, sensors, display devices, etc. of a motor vehicle or of another technical system.

As shown in FIG. 1, the subscriber station 10 has a communication control device 11, a transmitting/receiving device 12 and a transmission waiting device 15. The subscriber station 20 has a communication control device 21 and a transmitting/receiving device 22 and optionally a transmission waiting device 25. The subscriber station 30 has a communication control device 31, a transmitting/receiving device 32, and optionally a transmission waiting device 35. The transmitting/receiving devices 12, 22, 32 of the subscriber stations 10, 20, 30 are each directly connected to the bus 40, even if this is not shown in FIG. 1.

The communication control devices 11, 21, 31 each serve for controlling a communication of the particular subscriber station 10, 20, 30 via the bus 40 with at least one other subscriber station of the subscriber stations 10, 20, 30 which are connected to the bus 40. For this purpose, the communication control devices 11, 31 create and/or read first messages 45 which are, for example, CAN FD messages 45. The CAN FD messages 45 are formed on the basis of a CAN FD format, which is defined in ISO 11898-1:2015.

The communication control devices 11, 31, can also be designed to provide or receive a CAN FD message 45 or a CAN XL message 46 to or from the associated transmitting/receiving device 12, 32 as required. The communication control devices 11, 31 thus create and read a first message 45 or a second message 46, wherein the first and second messages 45, 46 differ in their data transmission standard, namely in this case CAN FD or CAN XL. The CAN XL messages 46 are formed on the basis of a CAN XL format, which is defined in CiA610-1 and ISO 11898-1.

The communication control device 21 can be designed as a conventional CAN controller according to ISO 11898-1:2015, i.e., as a CAN FD-tolerant Classical CAN controller or a CAN FD controller. The communication control device 21 creates and reads first messages 45, for example CAN FD messages 45. In the case of the CAN FD messages 45, a number of 0 to 64 data bytes can be included, which are in addition transmitted at a significantly faster data rate than in the case of a Classical CAN message. In particular, the communication control device 21 is designed as a conventional CAN FD controller.

The transmitting/receiving device devices 12, 32 can be designed as required in order to provide messages 45 according to the CAN FD format or messages 46 according to the current CAN XL format for the associated communication control device 11, 31 or to receive them from the latter.

The transmitting/receiving device 22 can be designed as a conventional CAN transmitting/receiving device according to ISO 11898-1:2015 or a CAN FD transmitting/receiving device.

In addition, the transmission waiting devices 15, 25, 35 are present, which are described in more detail below.

FIG. 2 shows the basic structure of a frame 450 for the message 45, as is provided by the communication control device 11 for the transmitting/receiving device 12 for transmitting to the bus 40.

According to FIG. 2, the frame 450 is divided, for CAN communication on the bus 40, into different communication phases 451, 452, namely an arbitration phase 451 (first communication phase) and a data phase 452 (second communication phase). After a start bit SOF, the frame 450 has an arbitration field 453, a control field 454, a data field 455, a checksum field 456 and a frame end field 457. A frame is used for the message 46, which has the same basic structure as shown for the frame 450 in FIG. 2.

In the arbitration phase 451, with the aid of an identifier (ID) with e.g., bits ID28 to ID18 in the arbitration field 453, negotiation takes place bit by bit between the subscriber stations 10, 20, 30 as to which subscriber station 10, 20, 30 wishes to send the message 45, 46 with the highest priority and will therefore receive exclusive access to the bus 40 of the bus system 1 for the next time for transmission in the subsequent data phase 452. In the arbitration phase 451, a physical layer is used with the bus states of dominant and recessive. The physical layer corresponds to the bit transmission layer or layer 1 of the conventional OSI model (Open Systems Interconnection Model).

A transmitter of the message 45, for example subscriber station 10, starts a transmission of bits of the control field 454 and bits of the data phase 452 to the bus 40 only if the subscriber station 10 as the transmitter has won the arbitration and the subscriber station 10 as the transmitter thus has exclusive access to the bus 40 of the bus system 1 for transmission. The same applies to the subscriber stations 20, 30 when they want to transmit a message 45 or 46 to the bus 40.

In the data phase 452, in addition to a portion of the control field 454, the payload data of the frame 450 or of the message 45 or of the message 46 from the data field 455 and the checksum field 456 are transmitted.

The checksum field 456 can contain a checksum regarding the data of the data phase 452. At the end of the data phase 452, the arbitration phase 451 is switched back to.

In the frame end field 457, an ACK-Slot bit is provided, in which subscriber stations, which currently are only receivers of the frame 450 but not transmitters of the frame, can confirm or not confirm the correct reception of the frame 450 from the bus 40. An ACK-Del bit is also provided, which is also called an ACK delimiter. A bit sequence is provided in the frame end field 457, which bit sequence marks the end of the frame 450. The bit sequence at the end of the frame end field 457 thus serves to mark the end of the frame 450. The bit sequence cannot occur within frame 450. As a result, the end of the frame 450 can be reliably recognized by the subscriber stations 10, 20, 30.

After the frame end field 457, an interframe space (IFS) (not shown in FIG. 2) follows. In CAN FD, this interframe space (IFS) is designed in accordance with ISO 11898-1:2015. The interframe space (IFS) has at least 3 bits.

Otherwise, the fields and bits mentioned are from ISO 11898-1:2015 and CiA610-1 and for this reason are not described in more detail here.

Thus, in the arbitration phase 451 as the first communication phase, the subscriber stations 10, 30 use, in part, a format from CAN/CAN FD, according to ISO11898-1:2015. However, with CAN FD and CAN XL, an increase in the net data transmission rate is possible compared to CAN in data phase 452 as the second communication phase; with CAN XL this is up to 20 megabits per second. With CAN XL, it is also possible to increase the size of the payload data per frame to up to 2048 bytes.

An important point during the phase 451 at the beginning of the frame is that the conventional CSMA/CR method is used, which allows simultaneous access of the subscriber stations 10, 20, 30 to the bus 40 without the higher priority message 45, 46 being destroyed. As a result, further bus subscriber stations 10, 20, 30 can be added relatively easily to the bus system 1, which is very advantageous.

The CSMA/CR method requires that there must be so-called recessive states on the bus 40, which can be overwritten by other subscriber stations 10, 20, 30 with dominant states on the bus 40. In the recessive state, high-impedance conditions prevail at the individual subscriber station 10, 20, 30, which in combination with the parasites on the bus circuit results in longer time constants. This leads to a limitation of the maximum bit rate of the present-day CAN-FD physical layer at currently about 2 megabits per second in real vehicle use. With the new CAN SIC physical layer, even 5 megabits per second and up to 8 megabits per second are possible.

Figure 3:
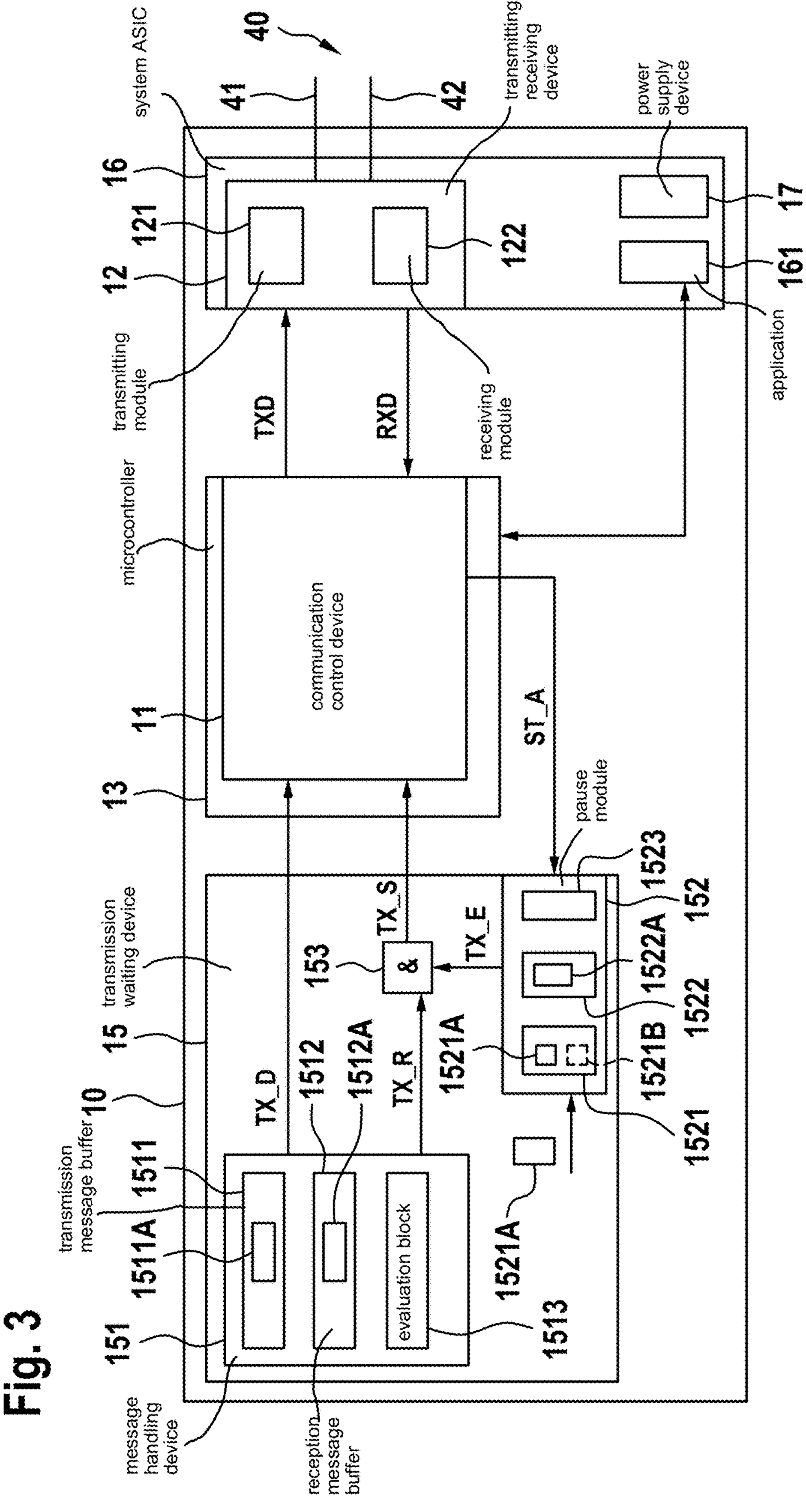
FIG. 3 shows a schematic block diagram of a subscriber station of the bus system according to the first exemplary embodiment of the present invention.

FIG. 3 shows the basic structure of the subscriber station 10 with the communication control device 11, the transmitting/receiving device 12 and the separately arranged transmission waiting device 15. The subscriber station 20 has an identical structure in relation to the transmission waiting device 15. The subscriber station 30 can be constructed in a similar way to that shown in FIG. 3, but the transmission waiting device 35 as shown in FIG. 1 is integrated into the communication control device 31. For this reason, the subscriber station 30 is not described separately.

According to FIG. 3, the subscriber station 10 has, in addition to the communication control device 11, the transmitting/receiving device 12 and the transmission waiting device 15, a microcontroller 13 to which the communication control device 11 is assigned, and a system ASIC 16 (ASIC=application-specific integrated circuit), which can alternatively be a system basis chip (SBC) on which a plurality of functions necessary for an electronics module of the subscriber station 10 are combined. In the system ASIC 16, a power supply device 17, which supplies the transmitting/receiving device 12 with electrical energy, is installed in addition to the transmitting/receiving device 12. The power supply device 17 usually supplies a voltage CAN_supply of 5 V. Depending on requirements, however, the power supply device 17 can provide a different voltage with a different value. Additionally or alternatively, the power supply device 17 can be designed as a current source.

The transmission waiting device 15 can be arranged in a separate microcontroller (not shown), as shown in FIG. 3. Alternatively, the transmission waiting device 15 can be arranged in the microcontroller 13.

The transmission waiting device 15 has a message handling module 151, a pause module 152 and a logic module 153. The modules 151, 152, 153 create and/or process digital signals TX_D, TX_R, TX_E and TX_S.

The pause module 152 can be arranged in the transmission waiting device 15, as shown in FIG. 3. Alternatively, the pause module 152 is allocated to the device 11, in particular arranged in the device 11. Alternatively, the pause module 152 can be arranged separately from the transmission waiting device 15 and separately from the microcontroller 13 and the device 11.

The message handling module 151 has a transmission message buffer 1511 for storing at least one transmission message 1511A, a reception message buffer 1512 for storing at least one reception message 1512A, and an evaluation block 1513. The pause module 152 has a configuration buffer 1521, a counter 1522 and an evaluation block 1523.

With the pause module 152, a configuration parameter 1521A and optionally, as at least one other configuration parameter, at least one type 1521B of an event is stored in the configuration buffer 1521. The counter 1522 serves for counting and thereby determines a count value 1522A, which can be reset to an initial value, in particular 0, by resetting.

The logic module 153 is designed for logical linking of signals. With the example in FIG. 3, the logic module 153 is an AND module. However, the logic module 153 is not limited to this, but can have at least one other component, so that the logic module 153 fulfills its function as described below.

The configuration parameter 1521A configures the transmission waiting device 15 or the pause module 152. The configuration parameter 1521A can be set as required for this purpose, in particular when commissioning the subscriber station 10. The configuration parameter 1521A determines how long the subscriber station 10 must wait before it is allowed to transmit a transmission message 1511A provided in the transmission message buffer 1511. The configuration parameter 1521A can also be called a TX pause. The configuration r in relation to the at least one type 1521B of an event is described in more detail below.

The transmission waiting device 15 is described in more detail below with reference to FIG. 8 and FIG. 9.

According to FIG. 3, the system ASIC 16 has in particular an application 161, which can be designed as a computer program (app) or software. Such an application is a technical application 161. The application 161 is, for example, any application in a vehicle. In particular, the application is a control system for an air conditioning system and/or a windshield washer system and/or a driver assistance system, etc. For example, the windshield washer system controls the movement of at least one windshield wiper (actuator) using data from a rain sensor and/or wind sensor and/or speed sensor and/or light sensor and/or a warning light (actuator) can be switched on or off. However, the application 161 is not limited to one of the aforementioned systems or parts thereof.

The transmitting/receiving device 12 also has a transmitting module 121 and a receiving module 122. Although reference is always made to the transmitting/receiving device 12 below, it is alternatively possible to provide the receiving module 122 in a separate device externally from the transmitting module 121. The transmitting module 121 and the receiving module 122 can be constructed as in a conventional transmitting/receiving device 22. The transmitting module 121 can in particular have at least one operational amplifier and/or a transistor. The receiving module 122 can in particular have at least one operational amplifier and/or a transistor.

The transmitting/receiving device 12 is connected to the bus 40, more specifically its first bus wire 41 for CAN_H and its second bus wire 42 for CAN_L. The voltage supply for the power supply device 17 for supplying the first and second bus wires 41, 42 with electrical energy, in particular with the voltage CAN-Supply, is effected via at least one terminal, which is not shown in the figures. The connection to ground or CAN_GND is realized via a terminal (not shown). The first and second bus wires 41, 42 are terminated with a terminating resistor (not shown).

In the transmitting/receiving device 12, the first and second bus wires 41, 42 are connected not only to the transmitting module 121, but also to the receiving module 122, although the connections are not shown in FIG. 3 for the sake of simplicity. The transmitting module 121 is also referred to as a transmitter. The receiving module 122 is also referred to as the receiver.

Figure 4:
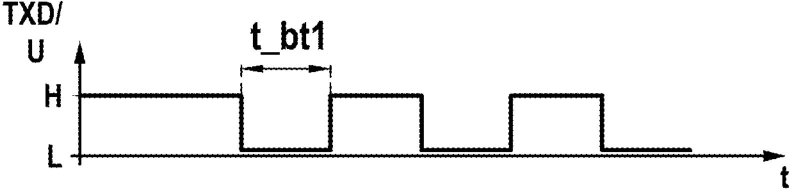
FIG. 4 shows a time profile of a digital transmission signal during operation of the bus system at the subscriber station, which is connected at least with a second subscriber station to the same bus of the bus system, according to an example embodiment of the present invention.
Figure 5:
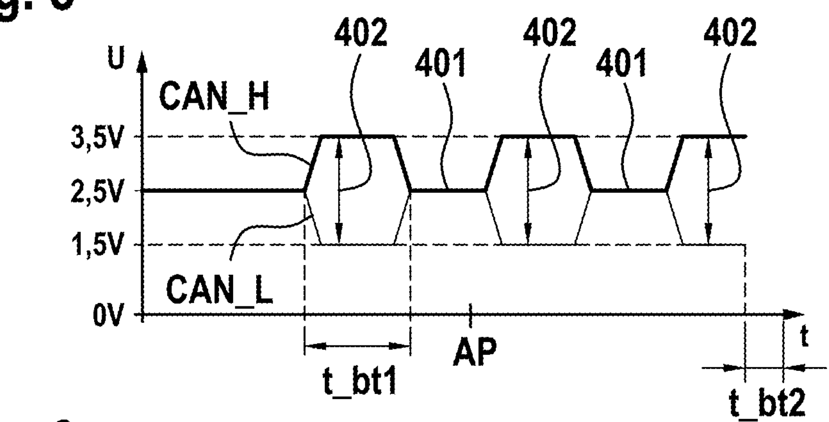
FIG. 5 shows a time profile of bus signals CAN_H and CAN_L at the subscriber station according to the first exemplary embodiment of the present invention.

During operation of the bus system 1, the transmitting module 121 of FIG. 3 can convert in series a transmission signal TXD from the communication control device 11 into corresponding signals CAN_H, CAN_L for CAN or CAN FD and into signals CAN_XL_H, CAN_XL_L for CAN XL for the bus wires 41, 42. The transmitting module 121 transmits these signals to the bus wires 41, 42 of the bus 40. The digital transmission signal TXD is based on a frame 450 according to FIG. 2, as mentioned before. FIG. 4 shows an example of a transmission signal TXD over time t. FIG. 5 shows the signals CAN_H, CAN_L to the bus 40 resulting from the transmission signal TXD of FIG. 4.

Figure 6:
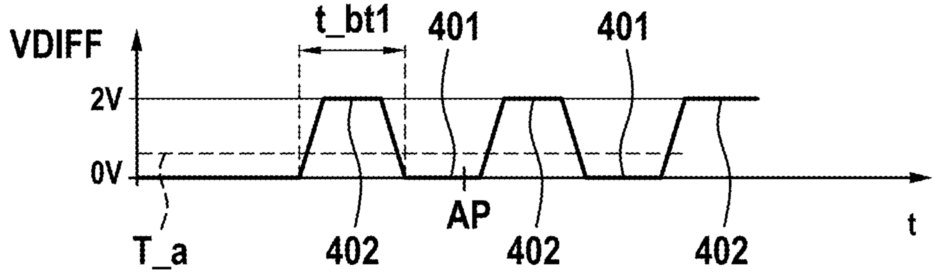
FIG. 6 shows a time profile of a differential voltage VDIFF of bus signals CAN_H and CAN_L at the subscriber station according to the first exemplary embodiment of the present invention.

According to the example of FIG. 5, the signals CAN-XL_H and CAN-XL_L have, at least in the arbitration phase 451, the dominant and recessive bus levels 402, 401, as from CAN. A difference signal VDIFF=CAN-XL_H−CAN-XL_L, which is shown in FIG. 6 for the arbitration phase 451, is formed on the bus 40. The individual bits of the signal VDIFF or CAN_H, CAN_L have a bit time t_bt1 in the arbitration phase 451. In the data phase 452, the bits of the signals CAN_H and CAN_L can be transmitted faster, i.e. with a shorter bit time t_bt2, than in arbitration phase 451 in the case of CAN FD and CAN XL. In CAN FD und CAN XL, the signals CAN-XL_H and CAN-XL_L thus differ in the data phase 452 from the conventional signals CAN_H and CAN_L, at least in terms of their faster bit rate.

The sequence of states 401, 402 for the signals CAN-XL_H, CAN-XL_L in FIG. 5 and the resulting profile of the voltage VDIFF of FIG. 6 serves only to illustrate the function of the subscriber station 10. The sequence of the data states for the bus states 401, 402 can be selected as required.

From the signals CAN_H and CAN_L etc. and VDIFF received from the bus 40, the receiving module 122 of FIG.

Figure 7:
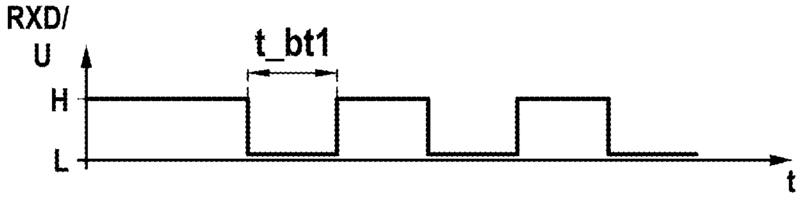
FIG. 7 shows a time profile of a digital reception signal that the subscriber station generates from a signal received from the bus, according to an example embodiment of the present invention.

3 forms a digital reception signal RXD (FIG. 7), and forwards it to the communication control device 11, as shown in FIG. 3.

In an operating mode B_LB (Idle), the communication control device 11 has recognized the idle or standby state of the CAN bus 40. That is to say, the communication control device is waiting for the reception of a message 45, 46. In this state, no communication takes place on the bus 40. In other words, no signal is received at the terminal of the communication control device 11 of FIG. 3 for the reception signal RXD of FIG. 7, or the value logical 1 is present, since the recessive level on the bus 40 corresponds to a bit value=1 or a logical 1 in the reception signal RXD.

The mode of operation of the transmission waiting device 15, which differs from current communication standards for Classical CAN, for CAN FD and for CAN XL, is also described below with reference to FIG. 8 and FIG. 9. The modules and/or blocks of the device 15 can be implemented in hardware and/or software.

With the transmission waiting device 15 of FIG. 3, the message handling module 151, in particular its evaluation block 1513, evaluates whether a transmission message 1511A is available for transmission in the transmission message buffer 1511. Optionally, the evaluation block 1513 can evaluate whether a reception message 1512A is stored in the reception message buffer 1512. If a transmission message 1511A is ready for transmission, the message handling module 151, in particular its evaluation block 1513, signals that it is ready by setting the signal TX_R accordingly. In particular, the evaluation block 1513 sets the signal TX_R to logic 1. At the same time, the message handling module 151, in particular its evaluation block 1513, provides the communication control device 11 with the data or the transmission message 1511A as the signal TX_D. The communication control device 11 transmits the data or the transmission message 1511A according to a frame 450 as the signal TXD to the CAN bus 40 if the signal TX_S is set accordingly and the CAN bus 40 is not occupied by another message.

The process of setting the TX_S signal is as follows. The pause module 152 receives at least one item of status information ST_A from the communication control device 11. The at least one item of status information ST_A indicates a status or state to the bus 40. The status information ST_A contains at least one event to which the pause module 152 reacts. For this purpose, the pause module 152 evaluates the at least one item of status information ST_A using the configuration buffer 1521, in which the configuration parameter 1521A is stored, and/or the counter 1522.

The pause module 152, in particular its evaluation block 1523, creates a digital signal TX_E as a result of its evaluation. The pause module 152, in particular its evaluation block 1523, outputs the signal TX_E to the logic module 153. The TX_E signal is also referred to below as the TX_E transmission delay signal. Alternatively, the signal TX_E can be referred to as the transmission enable signal TX_E.

For example, TX_E=0 means that the transmission of a frame 450 or the signal T_D corresponding to the transmission message 1511A must not be started. In this example, a logical value 1 of the signal TX_E or TX_E=1 means that the transmission of a frame 450 may be started on the basis of the signal T_D corresponding to the transmission message 1511A. If the transmission of a frame 450 on the basis of the signal T_D corresponding to the transmission message 1511A may not be started, the pause module 152 delays the provision of the transmission message 1511A to the communication control device 11. If the transmission of a frame 450 or the signal T_D corresponding to the transmission message 1511A may be started, the pause module 152 does not delay the provision of the transmission message 1511A to the communication control device 11. In other words, the pause module 152 enables the provision of the transmission message 1511A to the communication control device 11 or to the transmitting/receiving device 12 for transmission to the bus 40.

The logic module 153 links the signal TX_E with the digital signal TX_R and outputs a digital signal TX_S.

Only if the transmission waiting device 15 has determined that the transmission message 1511A may be transmitted to the bus 40 is a corresponding signal TX_S output to the communication control device 11. With the example mentioned above for the signal TX_E and the logic module 153, the transmission waiting device 15, in particular its logic module 153, outputs the signal TX_S=1 to the communication control device 11 if the transmission of a frame 450 or the signal T_D corresponding to the transmission message 1511A may be started.

The pause module 152 has the counter 1522, which is used to count events, as described below. For determining the events, the pause module 152, in particular its evaluation block 1523, evaluates the status information ST_A transmitted by the communication control device 11.

In particular, the pause module 152 uses two types 1521B of events in the status information ST_A for counting with the counter 1522. Which at least one type 1521B of the at least one event is to be counted can optionally be configured using the type 1521B stored as a configuration parameter in the configuration buffer 1521. The two types 1521B of events in the status information ST_A can be an event E1 and an event E2, as shown as an example in FIG. 8.

The event E1 means that an idle bit "i" has been seen. This means that the subscriber station 10, in particular its communication control device 11, sees the bus 40 for one bit in the idle state or standby state.

The event E2 means that frame reception has started. This means that the subscriber station 10, in particular its communication control device 11, has started receiving a frame 450. In the CAN standard, this state or status of the subscriber station 10 is referred to as the receiver. Each reception start is counted, even if this frame was not successfully received, e.g. because a reception error was detected in frame 450 during reception. Optionally, only each successful reception can be counted instead of the reception start.

The pause module 152 does not distinguish whether only the event E1 or only the event E2 or any mixture of events E1, E2 occurs.

In addition, the pause module 152 sets the signal TX_E accordingly if the total number of TX_pause events E1, E2 configured with the configuration parameter 1521A is seen. With this example, the configuration parameter 1521A has a value N, which is an integer greater than or equal to 0.

In mathematical terms, the signal TX_E is set, in particular to 1, in order not to delay (any longer) the forwarding of the transmission message 1511A to the device 11 if the following condition is met:

$$\text{Configuration parameter } 1521A == \text{TX\_Pause\_Cnt} == x + y,$$

where x is the number of counted events E1 and y is the number of counted events E2.

Depending on the implementation, the value of the signal TX_E can be set either immediately as TX_E=0 or as TX_E=1 after starting the subscriber station 10. Both options are functional and possible.

If one of the following events E3 to E5 occurs, the pause module 152 resets the signal TX_E, in particular to 0, in order to delay forwarding the transmission message 1511A to the device 11 or, in a frame 450, to the transmitting/receiving device 12. Whether all three different events E3 to E5 or only a subset, in particular at least one of the events E3 to E5, are/will be evaluated can be implementation-specific or can be configurable for the user by means of the optional at least one type or parameter 1521B. In addition, the pause module 152 resets the count value 1522A if one of the following events E3 to E5 occurs.

Event E3: The subscriber station 10 has successfully transmitted a frame 450 or a transmission message 1511A to the other subscriber stations 20, 30 of the bus system 1. This means that the transmitting subscriber station 10 has received an acknowledgment of receipt in the ACK field provided for this purpose (at least one bit) in the frame 450 from at least one receiving station. Thus, an entire frame 450 has been successfully transmitted.

Event E4: The subscriber station 10 has recognized an error during transmission and aborts transmission of the frame, or subscriber station 10 sees an ACK error, which means that subscriber station 10 has not received an "error-free" acknowledgment of receipt in the designated ACK field (at least one bit) from the receiving stations.

Event E5: The subscriber station 10 has started transmitting a frame 450 on the basis of a transmission message 1511A to the bus 40.

In particular, only the events E3, E4 are used. This combination means that the subscriber station 10 can retry transmitting a frame 450 an infinite number of times after the subscriber station 10 has lost the arbitration. This is desirable and thus advantageous because the subscriber stations 10, 20, 30 to the bus 40 do not have a fixed transmitter sequence, and arbitration thus occurs on a regular basis.

Depending on the value of the configuration parameter 1521A, and thus depending on the configuration of the transmission waiting device 15 or the pause module 152, the subscriber station 10 has one of the following three operating modes.

Operating mode B1 corresponds to 100% arbitration. In this case, the subscriber station 10 behaves like a standard CAN subscriber station in accordance with the ISO standards mentioned above.

Operating mode B2 corresponds to some determinism, some arbitration. In this case, at least the subscriber station 10 behaves only partially like a standard CAN subscriber station in accordance with the aforementioned ISO standards.

Operating mode B3: 100% deterministic bus access, for each subscriber station 10, 20, 30 in the bus system 1. In this case, each of the subscriber stations 10 has the functions described above in addition to the functions of a standard CAN subscriber station in accordance with the ISO standards mentioned above.

Figures 8, 9:
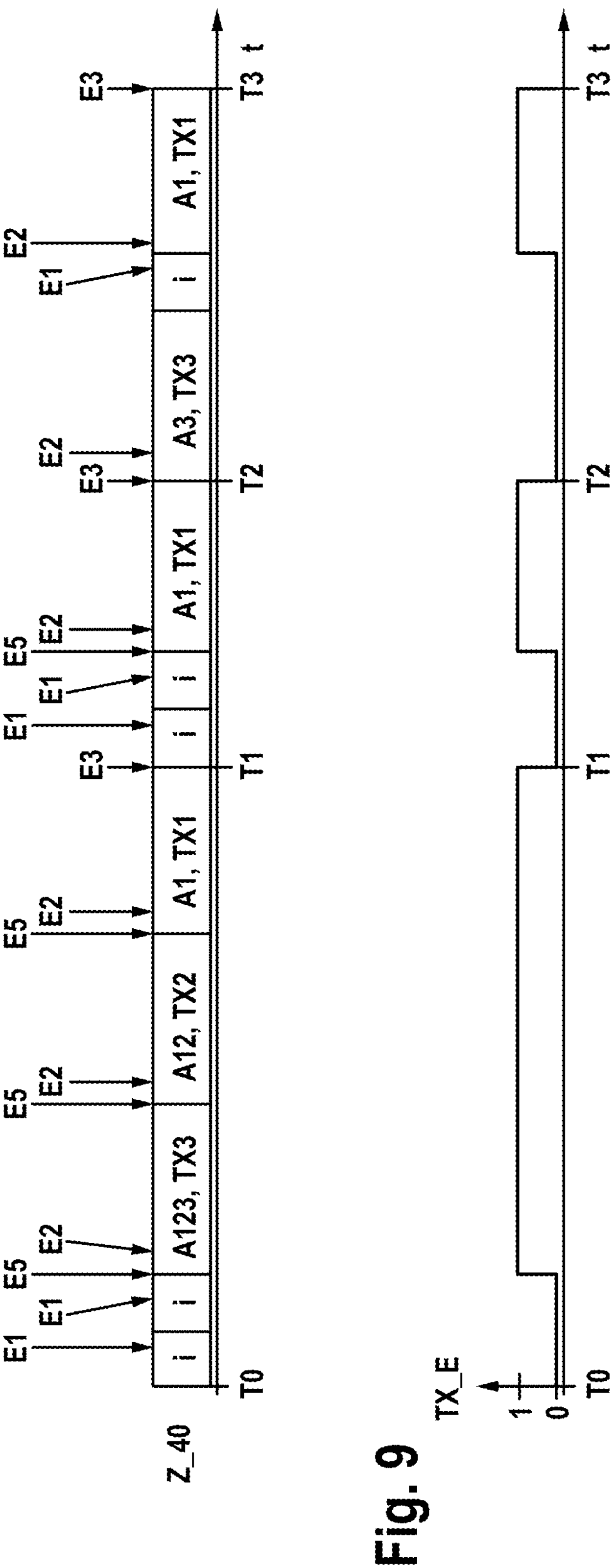
FIG. 8 shows a diagram of states (status) on a bus of the bus system over time, which can occur during operation of the bus system according to the first exemplary embodiment of the present invention.
FIG. 9 shows a time profile of a signal for enabling or not enabling the transmission of the subscriber station of FIG. 3 to the bus of the bus system of FIG. 1.

FIG. 8 and FIG. 9 illustrate the above-described mode of operation of the subscriber station 10 in the bus system 1 over time t in more detail for a specific example. With the example, the following specifications apply:

A) The parameter 1521A (TX_Pause)=2 is configured in all 3 subscriber stations 10, 20, 30 in FIG. 1.

B) The TX_E signal is reset in all 3 subscriber stations 10, 20, 30 of FIG. 1 if event E3 or event E4 occurs.

C) The subscriber station 10 would like to transmit three frames or transmission messages 1511A to the bus 40 after starting.

D) The subscriber stations 20, 30 only transmit sporadically.

FIG. 8 visualizes the state or status Z_40 on the bus 40 over the time t for the specific example. The pause module 152 forms the signal TX_E of FIG. 9 from the status Z_40, as described above. For reasons of clarity, only the view of the subscriber station 10 is shown in FIG. 8 and described in more detail below. Since the method is decentralized, the view of the subscriber stations 20, 30 and the signal TX_E generated by them is the same.

With the specific example in FIG. 8, the subscriber stations 10, 20, 30 (FIG. 1) are switched on at the beginning and are all ready for operation at point in time TO in FIG. 8.

Now, all subscriber stations 10, 20, 30 (FIG. 1) start to wait for events of type event E1 or event E2, in order to be able to set the signal TX_E, as described above.

The subscriber station 10 sets the signal TX_E to 1 after two idle bits (i.e., after event E1 has occurred twice), as illustrated in FIG. 9. Since the signal is TX_E=1, the subscriber station 10 starts transmitting (event E5). However, the subscriber station 10 loses the arbitration twice, as follows. Initially, with the arbitration A123, all subscriber stations 10, 20, 30 participate in the arbitration, wherein the subscriber station 30 may transmit its frame 450 or transmission message 1511A, as shown with A123, TX3 in FIG. 8. Next, with the arbitration A12, the subscriber stations 10, 20 participate in the arbitration, wherein the subscriber station 20 may transmit its frame 450 or transmission message 1511A, as shown with A12, TX2 in FIG. 8. On the third transmission attempt, the subscriber station 10 can successfully transmit its frame, as shown with A1, TX1 in FIG. 8.

At point in time T1, i.e. after successful transmission (event E3), the subscriber station 10 sets the TX_E signal back to 0, as shown in FIG. 9.

After two idle bits (i.e., after two events E1 after point in time T1), the subscriber station 10 sets the signal TX_E back to 1, as shown in FIG. 9.

Only the subscriber station 10 participates in the next arbitration A1. Therefore, the subscriber station 10 can successfully transmit its second frame 450 or transmission message 1511A, as shown with A1, TX1 in FIG. 8.

At point in time T2, i.e. after successful transmission (event E3), the subscriber station 10 sets the TX_E signal back to 0, as shown in FIG. 9.

After starting the reception of a frame 450 or transmission message 1511A (event E2) and after an idle bit (event E1), the subscriber station 10 sets the signal TX_E back to 1, as shown in FIG. 9.

The subscriber station 10 can then successfully transmit its third frame 450 or transmission message 1511A, as shown with A1, TX1 in FIG. 8.

At point in time T3, i.e. after successful transmission (event E3), the subscriber station 10 sets the TX_E signal back to 0, as shown in FIG. 9.

Thus, the embodiment of the subscriber station 10 offers a highly straightforward and uncomplicated configuration of the subscriber station 10 and implementation of the method it carries out in the bus system 1. The same applies to the other subscriber stations 20, 30. The reason for this is that only one scalar parameter, namely the configuration parameter 1521A, is used per subscriber station 10, 20, 30. This means that the system designer can set the behavior on the bus 40 to one of the three different operating modes B1, B2, B3 mentioned above with just one configuration parameter 1521A per subscriber station 10, 20, 30. A smooth transition between operating modes B1, B2, B3 is possible, as described above and below.

For example, the configuration parameters 1521A of the subscriber stations 10, 20, 30 are set as follows.

Example 1

Configuration parameter 1521A of subscriber station 10 is set to 0.

Configuration parameter 1521A of subscriber station 20 is set to 0.

Configuration parameter 1521A of subscriber station 30 is set to 0.

With such a configuration, there is no limitation of the transmission behavior. Each of the subscriber stations 10, 20, 30 behaves as specified in the international standard ISO11898-1:2015 for CAN FD or the subsequent standard for CAN Xl. Thus, each of the subscriber stations 10, 20, 30 behaves in the same way as the users of a bus system would expect from a CAN node or subscriber station.

Example 2

Configuration parameter 1521A of subscriber station 10 is set to 2.

Configuration parameter 1521A of subscriber station 20 is set to 2.

Configuration parameter 1521A of subscriber station 30 is set to 2.

With such a configuration, the subscriber stations 10, 20 and 30 share the bus bandwidth equally. Each of the subscriber stations 10, 20, 30 receives ⅓ of the bus bandwidth or the frame rate.

This is a 100% deterministic bus access, because each subscriber station 10, 20, 30 is able to transmit a frame 450 or transmission message 1511A at the latest after two frames 450 or transmission message 1511A have been received.

Example 3

Configuration parameter 1521A of subscriber station 10 is set to 9.

Configuration parameter 1521A of subscriber station 20 is set to 9.

Configuration parameter 1521A of subscriber station 30 is set to 9.

With such a configuration, the same applies as in example 2. It is also possible to add 7 additional subscriber stations 10, 20, 30 to the bus 40, without having to change the configuration of the subscriber stations 10, 20, 30 already connected to the bus 40. If 10 subscriber stations 10, 20, 30 are connected to the bus 40, each of the 10 subscriber stations receives 1/10 of the bus bandwidth or the frame rate. This means that 100% deterministic bus access also applies to example 3.

Example 4

The configuration parameter 1521A is set differently for the subscriber stations 10, 20, 30. In this case, the configuration parameter 1521A has a different value for at least one subscriber station than for at least one other subscriber station on the bus 40. This means that the configuration parameter 1521A does not have to have the same value for all subscriber stations 10, 20, 30 on the bus 40. In this way, at least one subscriber station can be assigned a greater bandwidth or frame rate than at least one other subscriber station 10, 20, 30 on the bus 40.

Of course, instead of ten subscriber stations, more or fewer subscriber stations can be connected to the bus 40. Here, the configuration parameter 1521A can be set accordingly for the subscriber stations, as described in example 3.

According to a second exemplary embodiment, the transmission waiting device 15 of at least one subscriber station 10 of the bus system 1 is designed to transmit up to N frames 450 in succession before the device 15 sets its signal TX_E=0. N is a configurable parameter. N is a natural number greater than or equal to 1.

As long as the signal TX_E=1 is set, one of the subscriber stations 10, 20, 30 can transmit up to N frames 450, in particular in succession. This means that device 15 only sets its signal TX_E=0 after N messages have been transmitted. A sensible value range for N is 1 to 10, because this also gives other subscriber stations in the bus system 1 the chance or increases the chance of transmitting the frame 450.

In this way, one of the subscriber stations 10, 20, 30 can be allowed to transmit bursts of messages. This is particularly advantageous if a subscriber station predominantly transmits short messages compared to the other subscriber stations. This avoids unfairness when distributing the available communication bandwidth in the bus system 1.

According to a third exemplary embodiment, the transmission waiting device 15 of at least one subscriber station 10 of the bus system 1 is designed to transmit up to N bytes of payload data in succession before the device 15 sets its signal TX_E=0. N is a configurable parameter. N is a natural number greater than or equal to 1.

All above-described embodiments of the subscriber stations 10, 20, 30, of the bus system 1 and the method executed therein can be used individually or in all possible combinations. In particular, all features of the above-described exemplary embodiments and/or their modifications can be combined as desired. Additionally or alternatively, the following modifications are possible in particular.

Even if the present invention is described above using the example of the CAN bus system, the present invention can be used in any communication network and/or communication method in which two different communication phases are used in which the bus states generated for the different communication phases are different.

In particular, the bus system 1 according to the exemplary embodiments can be a communication network in which data can be transmitted in series at two different bit rates. It is advantageous, but not necessarily a prerequisite, for an exclusive, collision-free access of a subscriber station 10, 20, 30 to a common channel to be ensured for the bus system 1, at least for certain time periods.

In the exemplary embodiments, the number and arrangement of the subscriber stations 10, 20, 30 in the bus system 1 is arbitrary. In particular, the subscriber station 20 in the bus system 1 can be omitted. It is possible for one or more of the subscriber stations 10 or 30 to be present in the bus system 1. It is possible for all subscriber stations in the bus system 1 to be designed identically, i.e., only subscriber stations 10 or only subscriber stations 30 are present.

What is claimed is:

1. A subscriber station for deterministic communication in a serial bus system, comprising:

a communication control device configured to control a communication of the subscriber station with at least one other subscriber station of the bus system by generating a message based on a frame and by transmitting the message to a bus of the bus system and by evaluating at least one signal received from a bus of the bus system based on the frame, wherein a bit time of the frame in a first communication phase can differ from a bit time of the frame in a second communication phase; and a pause module configured to evaluate at least one item of status information output by the communication control device;

wherein the pause module is configured to generate and output a transmission delay signal based on a result of its evaluation, to delay or not delay a provision of a transmission message to the communication control device, wherein the transmission message is to be transmitted from the communication control device as a message to the bus.

2. The subscriber station according to claim 1, wherein the pause module is configured to set the transmission delay signal to a predetermined value, according to which the transmission to the bus of a transmission message provided to the communication control device is to be delayed, only after the communication control device has transmitted N frames, and wherein N is a natural number greater than or equal to 1.

3. The subscriber station according to claim 1, wherein:

the subscriber station further comprises a transmission message waiting device which includes the pause modul, and/or the pause module is further further configured to determine whether the transmission of the transmission message to the bus is to be delayed or not.

4. The subscriber station according to claim 3, further comprising:

a message handling module configured to provide the transmission message to the communication control device; and a logic module configured to output the transmission message to the communication control device based on the determination of the pause module.

5. The subscriber station according to claim 1, wherein the communication control device is configured to, in a first communication phase, negotiate with the other subscriber stations as to which of the subscriber stations of the bus system will be given at least temporarily exclusive, collision-free access to the bus in a subsequent second communication phase.

6. The subscriber station according to claim 1, wherein the pause module is configured to evaluate at least one item of status information in relation to at least one event on the bus and a configuration parameter.

7. The subscriber station according to claim 6, wherein the pause module includes a configuration buffer configured to store the configuration parameter, which is selectable for the subscriber station as required, and optionally a configuration parameter that specifies at least one type of the at least one event.

8. The subscriber station according to claim 6, wherein the at least one event on the bus includes that the communication control device sees the bus in an idle state for one bit.

9. The subscriber station according to claim 6, wherein the at least one event on the bus includes that the communication control device has started receiving a signal corresponding to the frame from the bus.

10. The subscriber station according to claim 6, wherein the at least one event on the bus includes that the communication control device has successfully transmitted a signal corresponding to the frame to the bus.

11. The subscriber station according to claim 6, wherein the at least one event on the bus includes that the communication control device has recognized an error when transmitting a signal corresponding to the frame.

12. The subscriber station according to claim 6, wherein the at least one event on the bus includes that the communication control device has started transmitting a signal corresponding to the frame.

13. The subscriber station according to claim 6, further comprising a counter for counting the at least one event, wherein the counter is configured to count all events that occur in the at least one item of status information output by the communication control device, and wherein the pause module changes a value of the transmission delay signal, in order to not delay for the communication control device the provision of a transmission message when the number of events counted by the counter is equal to the configuration parameter.

14. The subscriber station according to claim 13, wherein the pause module is configured to increment a count value of the counter after detecting one of the following events:

the communication control device sees the bus in an idle state for one bit, the communication control device has started receiving a signal corresponding to the frame from the bus, and wherein the pause module is configured to reset the count value of the counter after detecting one of the following events:

the communication control device has successfully transmitted a signal corresponding to the frame to the bus, the communication control device has recognized an error when transmitting a signal corresponding to the frame, the communication control device has started transmitting a signal corresponding to the frame a signal corresponding to the frame, and to change the value of the transmission delay signal, in order to delay for the communication control device the provision of a transmission message.

15. The subscriber station according to claim 1, further comprising:

a transmitting/receiving device, which is connected to the bus and is configured to generate a digital reception signal from the at least one signal received from the bus;

wherein the communication control device is configured to to sample and evaluate the reception signal (RxD) generated by the transmitting/receiving device according to a predetermined frame.

16. A bus system, comprising:

a bus; and at least two subscriber stations which are connected to one another via the bus in such a way that the subscriber stations can communicate in series with one another, each of the subscriber stations including:

a communication control device configured to control a communication of the subscriber station with at least one other subscriber station of the bus system by generating a message based on a frame and by transmitting the message to a bus of the bus system and by evaluating at least one signal received from a bus of the bus system based on the frame, wherein a bit time of the frame in a first communication phase can differ from a bit time of the frame in a second communication phase, and a pause module configured to evaluate at least one item of status information output by the communication control device, wherein the pause module is configured to generate and output a transmission delay signal based on a result of its evaluation, to delay or not delay a provision of a transmission message to the communication control device, wherein the transmission message is to be transmitted from the communication control device as a message to the bus.

17. A method for deterministic communication in a serial bus system, wherein the method is carried out by a subscriber station, which includes a communication control device and a pause module, wherein the communication control device is configured to control a communication of the subscriber station with at least one other subscriber station of the bus system by generating a message based on a frame and by transmitting the message to a bus of the bus system and by evaluating at least one signal received from a bus of the bus system based on the frame, wherein a bit time of the frame in a first communication phase can differ from a bit time of the frame in a second communication phase, and wherein the method comprises the following steps:

evaluating, with the pause module, at least one item of status information output by the communication control device; and generating, with the pause module based on a result of its evaluation, a transmission delay signal, to delay or not to delay a provision of a transmission message to the communication control device, wherein the transmission message is to be transmitted from the communication control device as a message to the bus.

* * * * *